Figure 1:
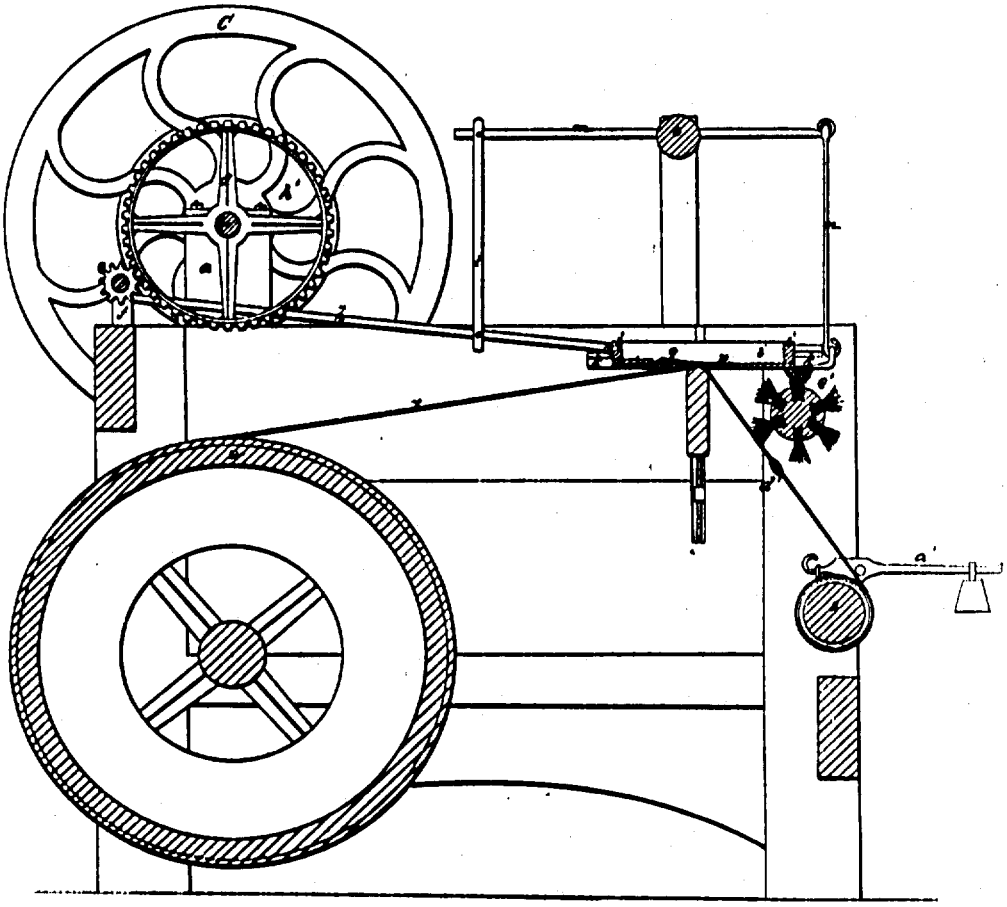
Figure 2:
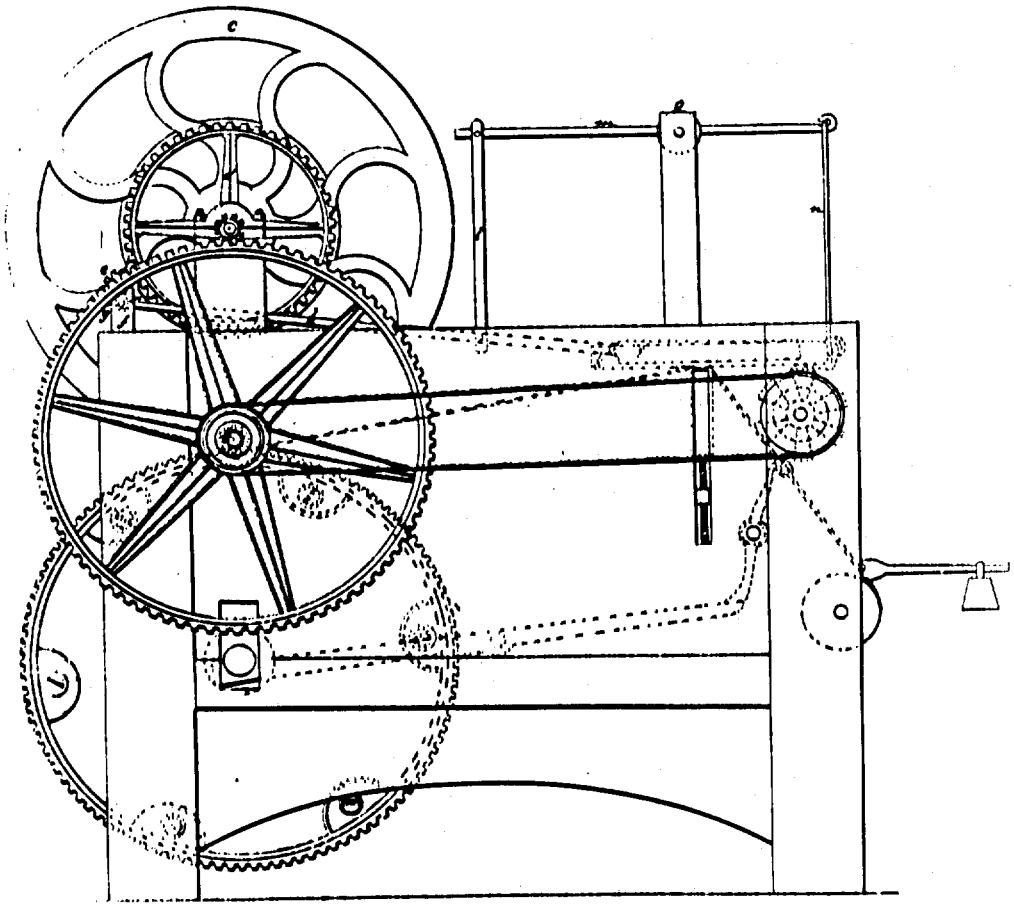
Figure 3:
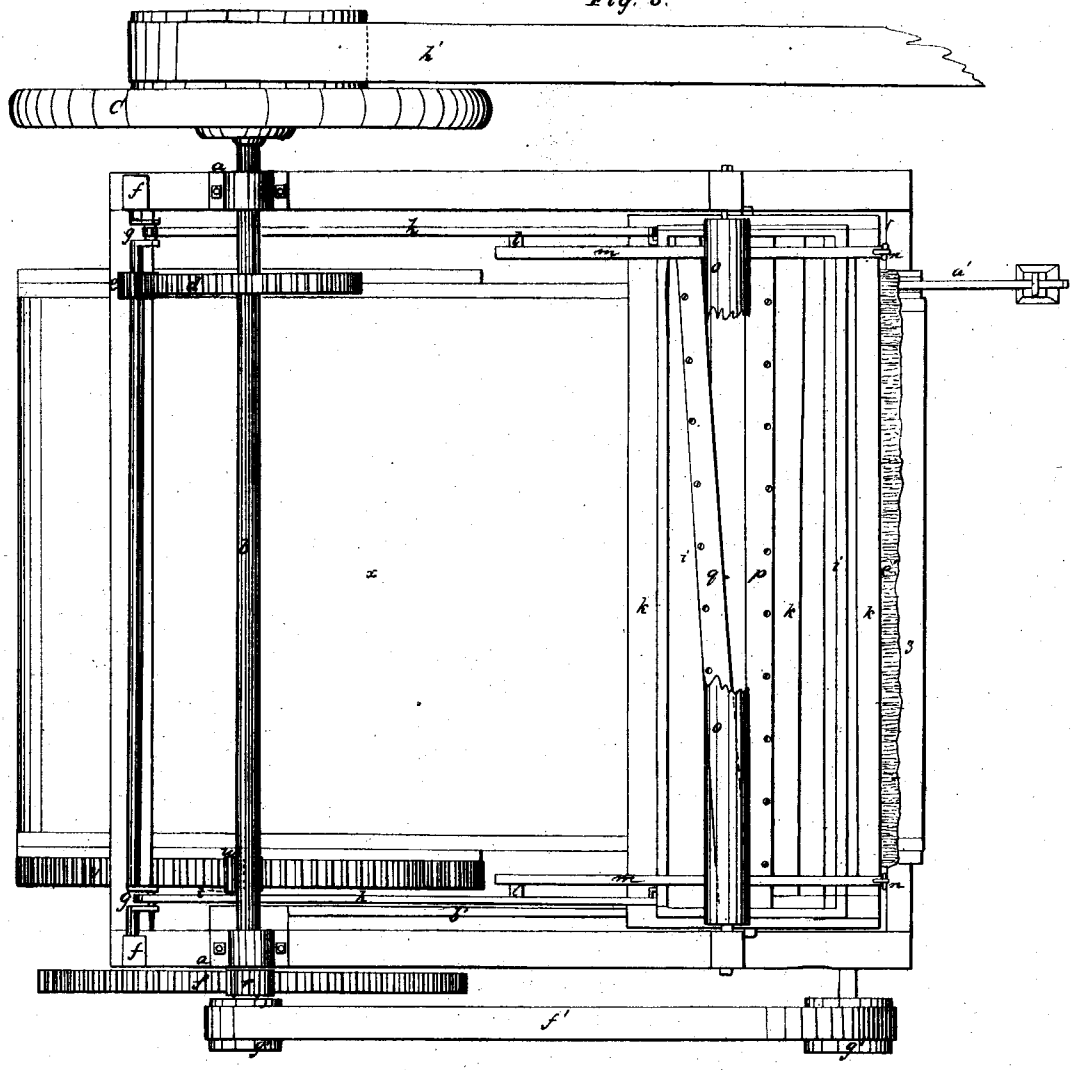

693x

Sheet 1. 3 Sheets.

B. Swift.

Cloth Shearing Mach.

Patented May 25, 1806.

R. PETERS, PHOTO-LITHOGRAPHER, WASHINGTON, D. C.

693x

Sheet 2. 3 Sheets.

B. Swift.

Cloth Shearing Mach.

Patented May 25, 1806.

H. PETERS, PHOTO-LITHOGRAPHER, WASHINGTON, D. C.

693X

B. Swift.

Cloth Shearing Mach.

Patented May 25, 1806.

N. PETERS, PHOTO-LITHOGRAPHER, WASHINGTON, D. C.

693X May 25, 1806 May 25, 1806

Beriah Swift of

Letters Patent.
Issued May 25. 1806.

The schedule referred to in these Letters Patent and making part of the same containing a description in the words of the said Beriah Swift himself of his Machine for shearing Cloth.

This shearing machine is constructed in the following manner. First it consists of a frame, which supports the whole machinery, of about four feet and three inches in length, three feet seven inches in width and three feet three inches in high. At the top of the posts plates are framed into them so high as to be even with the top of the main posts of the frame, about six inches from one end of the frame, are placed two short posts framed into the side plates opposite each other of about seven inches in height, On these short posts rests a shaft which turns and carries first, a balance wheel of thirty inches diameter, and a cogg wheel of fourteen and a half inches diameter and seventyfive coggs placed ten inches distant from the balance wheel. This cogg wheel operates upon a pinion made to match it of two inches and three fourths diameter and twelve coggs. This pinion is connected with, or attached to a shaft which is supported by two short studs framed into the end plate at the distance of about six inches from each end of said plate. On each end of this last mentioned shaft, is a crank of one and a quarter inch. To each of these cranks is attached a rod which is connected with a sliding frame. This frame is constructed to move in a horizontal direction by the operation of the cranks in turning. This sliding frame carries the upper shear. Immediately under this frame is another 693x
of the same length, that is to say, about two feet to which
is attached the under shear. The sliding frame being made to
move in the frame of the under shear these frames with which
the shears are connected are attached to the side plates To
each of the rods which connect the sliding frame with the crank
is attached a rod in a perpendicular position and the upper
ends of these perpendicular rods are connected with the ends
of two levers which pass through a roller nearly over the shears,
and are continued as far as the ends of the sliding frame
These levers are connected at the ends immediately above the
ends of the sliding frame, by two hooks placed in a perpen
-dicular position with the sides of the frame in which the under
shear is placed. The studs which support the roller are framed
into the side plates of the frame and are about fourteen inches
in height. The above mentioned levers being operated upon by
means of the crank with which they are connected as above des
-cribed, and turning upon the roller above mentioned cause
the shear frames to rise and fall in the operation of shearing.
The under shear is placed at right angles with the side plates
and the upper shear a little obliquely, so that when they close
at the heel they will be open at the other end about two
inches and a half - on the opposite end of the shaft of the bal
-ance wheel and cogg wheel above mentioned is a pinion of
one inch and a half with eight coggs this pinion matches
a cogg wheel of twenty seven inches diameter and one hundred
and forty four coggs which last mentioned is on a short shaft
passing through the side plate near the end, On the other
end of the short shaft is a pinion of two inches diameter
and eight coggs; This pinion being on the inside and the
last mentioned wheel on the outside of the aforesaid plate,
and close to it on each side this last pinion is to operate
upon a cogg wheel of thirty inches in diameter and one hun-
dred and twelve coggs which is fastened by means of passing on the [illegible]

693X of a cylinder of the same size. This cylinder is calculated to
turn by means of the pinion and coggs once round in the same
time that the balance wheel or crank turns two hundred and
fifty two times. This cylinder in turning receives the cloth after
it has passed under the shears in the process of shearing the
cloth is drawn [illegible] a shear board of about six inches deep
and one inch and a half thick and is rounded on the upp
side where the cloth rests upon it for the shears to strike it
as they are made to rise and fall by means of the levers.
above described. This shear board is placed under the shears
in such manner that the shears strike near the centre
of the upper edge of it in the operation of shearing and
is fitted in grooves made in the side plates of the frame and
is at right angles with them. This shear board is contrived by
means of screws to be raised or lowered as occasion may require
In the process of shearing the cloth is drawn off a small cy-
linder fixed in the end of the frame opposite the large cylinder
before mentioned nine inches below the bottom of the plate at the top of the
posts at the same end. This small cylinder is governed by
a short lever and an iron rod bent to the cylinder near
the end and by a small weight acting upon this lever. the
friction is increased so as to prevent the cloth from running
off too fast. In shearing, the large cylinder is made to fall
from its place when the last end of the cloth passes under the
shears so that the coggs are not operated upon by this pin-
nion intended to turn the large cylinder. This is effected
by means of a lever placed under the gudgeon of the cylinder
at one end and the other resting on a hook is caused to
fall by a rod attached to the cloth on the small cylinder.
It is also designed to construct a brush to turn upon the
cloth for the purpose of raising the nap thereof directly
before the shears. This brush is to be in the form of a cylinder
and will turn on a shaft passing through the said plates

L93X

The operation of this brush is to be performed by means of a Strap passing round a pully upon the end of this shaft and connected with another pully on the end of the that shaft, upon which is the wheel above mentioned on the outside of the frame — The above described machine is constructed so as to be worked either by water or by hand. if by water it may be done by means of a Strap passing round the ballance wheel and communicating with the water wheel — or the business of shearing may be performed by hand with great ease by fixing a crank on the end of the shaft of the ballance wheel on the same end with said wheel —

Witnesses

John [illegible]

Stephen [illegible] Jun.

Beriah Swift (Seal)

Drawing [illegible]

Exd [illegible]

[1160 [illegible]